US012802014B2

(12) United States Patent
Qazvinian et al.

(10) Patent No.: US 12,802,014 B2
(45) Date of Patent: Nov. 17, 2026

(54) INTELLIGENT PEOPLE ANALYTICS FROM GENERATIVE ARTIFICIAL INTELLIGENCE

(71) Applicant: Praisidio Inc., Menlo Park, CA (US)

(72) Inventors: Vahed Qazvinian, San Francisco, CA (US); Kenneth Richard Klein, Atherton, CA (US); Sergii Denysiuk, Wroclaw (PL); Gabriel Micko, Budapest (HU); Yinjian Huang, San Francisco, CA (US)

(73) Assignee: Praisidio Inc., Menlo Park, CA (US)

( * ) Notice: Subject to any disclaimer, the term of this patent is extended or adjusted under 35 U.S.C. 154(b) by 0 days.

(21) Appl. No.: 18/218,680

(22) Filed: Jul. 6, 2023

(65) Prior Publication Data

US 2025/0013963 A1 Jan. 9, 2025

(51) Int. Cl.

| | |
|---|---|
| ***G06F 40/30*** | (2020.01) |
| ***G06F 40/40*** | (2020.01) |
| ***G06Q 10/0639*** | (2023.01) |
| ***G06Q 10/105*** | (2023.01) |

(52) U.S. Cl.
CPC ......... *G06Q 10/0639* (2013.01); *G06F 40/30* (2020.01); *G06F 40/40* (2020.01); *G06Q 10/105* (2013.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | | |
|---|---|---|---|---|
| 7,805,706 | B1 * | 9/2010 | Ly | G06F 9/5083 717/124 |
| 8,375,008 | B1 * | 2/2013 | Gomes | G06F 16/10 707/694 |
| 10,877,964 | B2 * | 12/2020 | Brown | G06F 16/248 |
| 10,924,439 | B2 * | 2/2021 | Kamat | H04L 51/02 |
| 11,232,383 | B1 * | 1/2022 | Burns, Sr. | G06Q 10/0637 |
| 11,240,278 | B1 * | 2/2022 | Wang | H04L 65/4053 |
| 11,347,802 | B2 * | 5/2022 | Khillar | G06F 40/211 |
| 11,520,815 | B1 * | 12/2022 | Gutta | G06F 16/31 |
| 11,640,470 | B1 * | 5/2023 | Amar | G06F 21/577 726/22 |

(Continued)

*Primary Examiner* — Lamont M Spooner
(74) *Attorney, Agent, or Firm* — Cognition IP, P.C.; Edward Steakley

(57) ABSTRACT

The systems and methods described herein provide intelligent people analytics from generative artificial intelligence. In one embodiment, the system: receives a prompt related to people analytics from a client device associated with a user; generates an embedding representation of the received prompt using a generative AI system including one or more generative AI models; performs a similarity search using the generated embedding representation to identify similar prompts that have been submitted before; obtains an executable expression for responding to the received prompt; executes the executable expression using a data warehouse comprising one or more data sources to obtain a response to the received prompt; determines a type of response based on the nature of the received prompt; generates a response output based on the determined type and the response to the received prompt; and provides the response output to the client device associated with the user.

27 Claims, 7 Drawing Sheets

(56) References Cited

U.S. PATENT DOCUMENTS

| | | | | |
|---|---|---|---|---|
| 11,763,811 | B2 * | 9/2023 | Ogawa | G06Q 10/00<br>704/235 |
| 11,765,267 | B2 * | 9/2023 | Cole | H04M 3/5141<br>379/68 |
| 11,837,004 | B1 * | 12/2023 | Agrahari | G06F 16/8373 |
| 11,880,364 | B2 * | 1/2024 | Jiang | G06N 20/00 |
| 11,914,628 | B1 * | 2/2024 | Hearst | G06F 16/3329 |
| 2002/0156792 | A1 * | 10/2002 | Gombocz | G06F 16/20 |
| 2007/0090178 | A1 * | 4/2007 | Fujii | G05B 23/0264<br>235/375 |
| 2009/0063541 | A1 * | 3/2009 | Chu | G06F 16/84<br>707/999.102 |
| 2014/0278865 | A1 * | 9/2014 | Kumar | G06Q 30/0214<br>705/14.16 |
| 2014/0280158 | A1 * | 9/2014 | Shatz | G06F 16/2462<br>707/737 |
| 2017/0300712 | A1 * | 10/2017 | Timmerman | G06F 16/23 |
| 2018/0082183 | A1 * | 3/2018 | Hertz | G06N 5/00 |
| 2018/0253414 | A1 * | 9/2018 | Hailpern | G06F 3/0486 |
| 2018/0293257 | A1 * | 10/2018 | Li | G06F 16/275 |
| 2019/0042988 | A1 * | 2/2019 | Brown | G06F 16/9535 |
| 2019/0102725 | A1 * | 4/2019 | Xia | G06Q 10/063114 |
| 2019/0278777 | A1 * | 9/2019 | Malik | G06F 16/9024 |
| 2019/0354544 | A1 * | 11/2019 | Hertz | G06F 16/35 |
| 2020/0065303 | A1 * | 2/2020 | Bhattacharjee | G06F 16/278 |
| 2020/0234605 | A1 * | 7/2020 | Shuart | G06F 21/316 |
| 2020/0265365 | A1 * | 8/2020 | Kim | G06Q 10/06398 |
| 2020/0272994 | A1 * | 8/2020 | Silveira | G06N 20/20 |
| 2021/0134295 | A1 * | 5/2021 | Ogawa | G10L 15/1815 |
| 2021/0182291 | A1 * | 6/2021 | Yoldemir | G06F 16/24522 |
| 2021/0192283 | A1 * | 6/2021 | Guo | G06N 20/00 |
| 2021/0209705 | A1 * | 7/2021 | Englard | G06N 20/00 |
| 2021/0224858 | A1 * | 7/2021 | Khoury | G06Q 10/103 |
| 2021/0256861 | A1 * | 8/2021 | Hollander | G06F 16/906 |
| 2021/0295436 | A1 * | 9/2021 | Langdon, Jr. | G06F 16/24564 |
| 2021/0303263 | A1 * | 9/2021 | Kim | B60R 16/0231 |
| 2021/0312577 | A1 * | 10/2021 | Lim | G06F 16/21 |
| 2021/0382923 | A1 * | 12/2021 | Gragnani | G06F 16/3329 |
| 2022/0004547 | A1 * | 1/2022 | Lin | G06F 16/35 |
| 2022/0012289 | A1 * | 1/2022 | Ibraheem | G06N 20/00 |
| 2022/0067281 | A1 * | 3/2022 | Hu | G06F 40/284 |
| 2022/0138193 | A1 * | 5/2022 | Xu | G06F 40/35<br>704/9 |
| 2022/0179665 | A1 * | 6/2022 | Rathod | G06F 9/451 |
| 2022/0198151 | A1 * | 6/2022 | Park | G06F 40/44 |
| 2022/0210268 | A1 * | 6/2022 | Cole | G06N 20/00 |
| 2022/0343250 | A1 * | 10/2022 | Tremblay | G06Q 10/06316 |
| 2022/0343903 | A1 * | 10/2022 | Mostafazadeh | G06F 3/0481 |
| 2022/0358295 | A1 * | 11/2022 | Nair | G06F 16/3329 |
| 2023/0021797 | A1 * | 1/2023 | Gupta | G06F 16/3344 |
| 2023/0110057 | A1 * | 4/2023 | Kan | G06F 16/258<br>707/723 |
| 2023/0139783 | A1 * | 5/2023 | Garib | G06N 3/044<br>707/769 |
| 2023/0186124 | A1 * | 6/2023 | Sivakumar | G06F 40/216<br>705/45 |
| 2024/0045893 | A1 * | 2/2024 | Reddy | G06F 16/3344 |
| 2024/0095397 | A1 * | 3/2024 | Knuesel | G06F 16/252 |
| 2024/0119046 | A1 * | 4/2024 | Bhaisaheb | G06F 16/243 |
| 2024/0134865 | A1 * | 4/2024 | Bierner | G06F 40/30 |
| 2024/0202464 | A1 * | 6/2024 | Poirier | G06F 16/3326 |
| 2024/0288381 | A1 * | 8/2024 | Stowell | H01Q 13/20 |
| 2024/0289360 | A1 * | 8/2024 | Chepkwony | G06T 11/60 |
| 2024/0370476 | A1 * | 11/2024 | Madisetti | G06F 16/3329 |
| 2025/0005269 | A1 * | 1/2025 | Ahmed | G06F 40/186 |
| 2025/0251256 | A1 * | 8/2025 | Puttagunta | G01C 21/3833 |
| 2025/0315422 | A1 * | 10/2025 | He | G06F 16/2282 |

* cited by examiner

INTELLIGENT PEOPLE ANALYTICS FROM GENERATIVE ARTIFICIAL INTELLIGENCE

FIELD

The presently described systems and methods relate generally to human capital management, and more particularly, to providing intelligent people analytics from generative artificial intelligence.

BACKGROUND

Human capital management is a set of practices within an organization which are concerned with the recruitment, management, development, and optimization of employees as intangible, valuable assets within the organization. It is an important set of practices, as both workforce management and people analytics play a vital role in driving organizational success. However, traditional people analytics systems have suffered from limitations that hinder their effectiveness and restrict users' ability to explore and gain insights from available data about their company's workforce.

Typically, a company may rely on a pre-built dashboard with predetermined queries, leading to a lack of flexibility and inhibiting users' ability to ask specific, open-ended questions or submit open-ended prompts. Such pre-built dashboards provide information in response to very narrow and specific prompts or questions, and there are limitations on the ability to modify those questions or prompts in order to fit a company's specific needs.

Alternatively, a company may opt to build a custom dashboard for people analytics. However, in order to build a custom dashboard to provide responses to a company's specific analytics questions or prompts, a dedicated team would be needed in order to understand how to analyze data, process data, write code for building the dashboard, and more.

More recent attempts to solve this problem have involved the development of analytics systems that allow users to submit prompts in natural language format. However, these attempts have fallen short in providing accurate and relevant responses. Many systems rely on keyword matching and lack the ability to understand the semantic context of the prompts, resulting in inaccurate responses and limited insights. Furthermore, the lack of sophisticated artificial intelligence (hereinafter "AI") models in these systems often leads to unsatisfactory results and an inability to generate detailed reports or visualizations.

Thus, there is a need in the field of human capital management to create a new and useful system and method for providing intelligent people analytics from generative AI. The source of the problem, as discovered by the inventors, is limited flexibility and ability to submit open-ended prompts within traditional analytics systems, and a lack of relevant, quantifiable, and reliable data which can be received from multiple current sources and analyzed in a dynamic fashion as part of this open-ended prompt and response system.

DETAILED DESCRIPTION

Figure 1A:
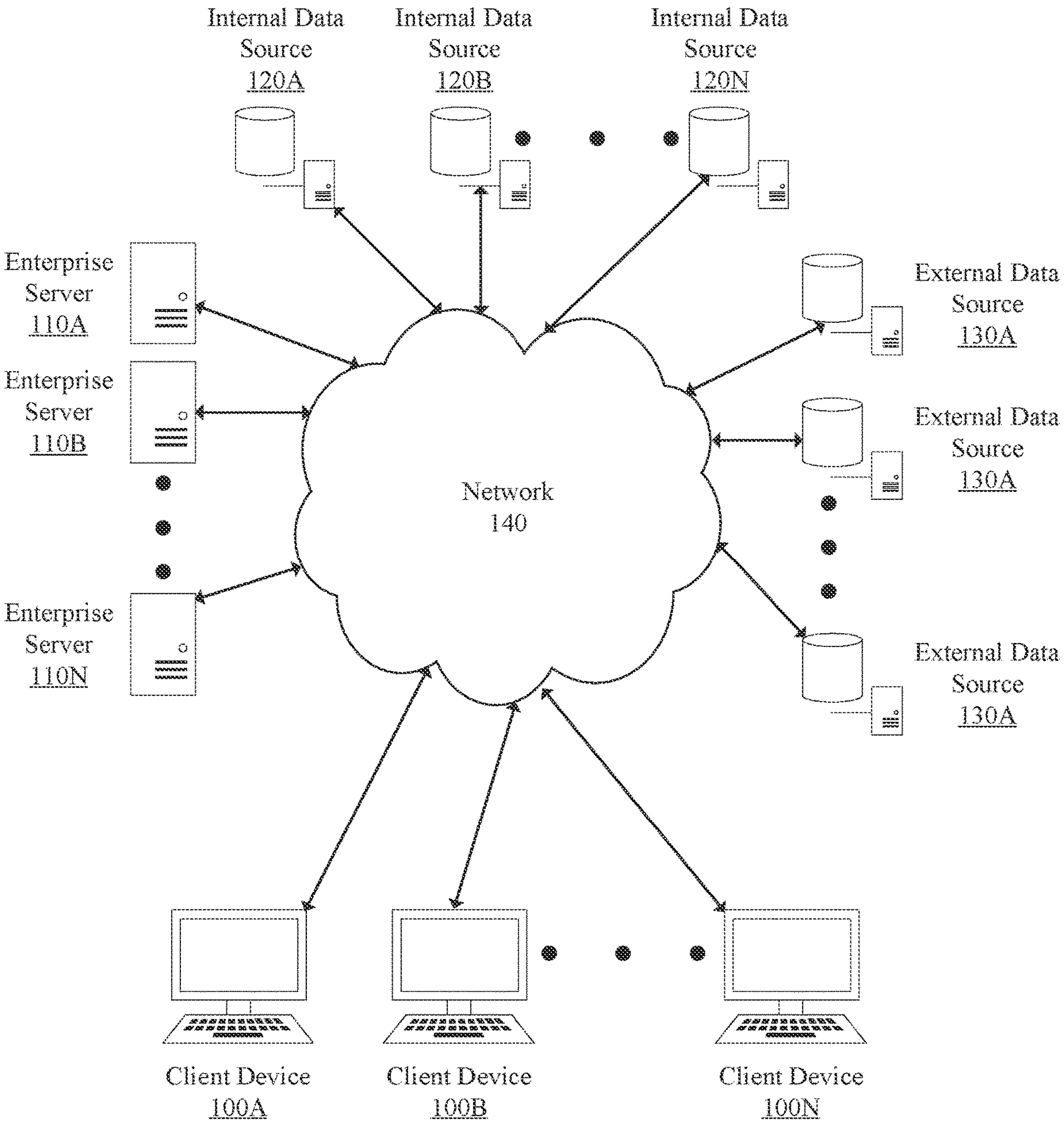
FIG. 1A is a diagram illustrating an exemplary environment in which some embodiments may operate.

In this specification, reference is made in detail to specific examples of the systems and methods. Some of the examples or their aspects are illustrated in the drawings.

For clarity in explanation, the systems and methods herein have been described with reference to specific examples, however it should be understood that the systems and methods herein are not limited to the described examples. On the contrary, the systems and methods described herein cover alternatives, modifications, and equivalents as may be included within their respective scopes as defined by any patent claims. The following examples of the systems and methods are set forth without any loss of generality to, and without imposing limitations on, the claimed systems and methods. In the following description, specific details are set forth in order to provide a thorough understanding of the systems and methods. The systems and methods may be practiced without some or all of these specific details. In addition, well known features may not have been described in detail to avoid unnecessarily obscuring the systems and methods.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

The systems and methods described herein provide for an open-ended prompt and response conversational system that combines the power of a generative AI model with a comprehensive workflow and architecture.

In one embodiment, the system: receives a prompt related to people analytics from a client device associated with a user; generates an embedding representation of the received prompt using a generative AI system incorporating one or more generative AI models; performs a similarity search using the generated embedding representation to identify similar prompts that have been submitted before; obtains an executable expression for responding to the received prompt; executes the executable expression using a data warehouse comprising one or more data sources to obtain a response to the received prompt; determines a type of response based on the nature of the received prompt; generates a response output based on the determined type and the response to the received prompt; and provides the response output to the client device associated with the user.

The features and components of these embodiments will be described in further detail in the description which follows. Additional features and advantages will also be set forth in the description which follows, and in part will be implicit from the description, or may be learned by the practice of the embodiments.

The following generally relates to providing people analytics from generative AI.

FIG. 1A is a diagram illustrating an exemplary environment in which some embodiments may operate. The diagram shows an example of an AI-based people analytics platform, in accordance with some embodiments. The example shown includes client device 100A-100N, enterprise server 110A-110N, internal data source 120A-120N, external data source 130A-130N and network 140. Enterprise server 110A-110N may be an example of, or include aspects of, the corresponding element or elements described with reference to FIG. 1B.

Client devices 100A-100N are any devices that send and receive information to and from the network 140 for purposes of operating a standalone application or web-based application in a browser. In varying embodiments, client devices 100A-100N may be personal computers, personal digital assistants (PDAs), tablet computing devices, laptop computers, smart phones, e-readers, virtual reality or augmented devices, wearables, or any other suitable systems capable of operating a standalone application or web-based application in a browser.

Enterprise server 110A-110N may be any computing device capable of executing the operation of processing engine 150. Enterprise server 110A-110N may be connected through a network 140 to client devices 100A-100N, internal data sources 120A-120N and external data sources 130A-130N. One or more of the internal data sources and external data sources may be part of a data warehouse.

Internal data sources 120A-120N are data sources relating to data and information kept within an organization and generally not shared outside of the organization. In some embodiments, data sources and their associated feeds can fall under a number of categories. In some embodiments, such categories can include, e.g., human resources (hereinafter "HR"), Communications, Compensation, Calendar and Task Tracking. In some embodiments, HR feeds capture employee history within the company e.g. job title change, cash compensation change, manager and location change, project history, and other associated HR data. In some embodiments, communications feeds capture communications metadata relating to which entities are communicating with whom, how often the communication occurs, and/or what the communication entails. In some embodiments, communications metadata can include, e.g., memberships in mailing lists, metadata relating to instant messaging and other conversational platforms and channels, as well as frequency and time of communication between entities. In some embodiments, communications feeds neither capture the subject line nor the content of emails or instant messages. In some embodiments, Calendar feeds capture metadata related to scheduled events and meetings, e.g., group meetings and manager one-on-one meetings. This feed helps the system understand latent networks (friends and collaborations) within the organization. In some embodiments, the system may track equity compensation through Compensation feeds. In some embodiments, task tracking feeds may collect and analyze work activity of entities by connecting to task tracking tools. In some embodiments, internal data sources may be related to one or more e-learning systems.

External data sources 130A-130N are data sources relating to data and information outside of an organization. In some embodiments, external data sources additionally or alternatively relate to information which is outside of the organization's ability to directly control or influence. In some embodiments, one or more external data sources may be accessed, viewed, or shared as a common source available across all customers or a subset of customers. In varying embodiments, external data can relate to sectors of industry, locations, economic or financial trends, global or regional variables, or any other suitable external data outside of an organization. In some embodiments, external data sources may include, e.g., feeds of census data such as rent, public competitor feeds such as a competitor's stock price, publicly published information relating to employees such as an employee profile on a professional networking site (e.g., LinkedIn), and public sentiment indices such as employer ratings and reviews from current and former employees posted on anonymous review platforms. For example, external data sources with respect to a particular organization or entity within the organization can include or relate to the average rent of San Francisco, recent stock market crashes, an uptrend or downtrend in that organization's industry, or employee attrition rates across different cities or countries. In some embodiments, external data sources may be related to one or more e-learning systems.

Figure 1B:
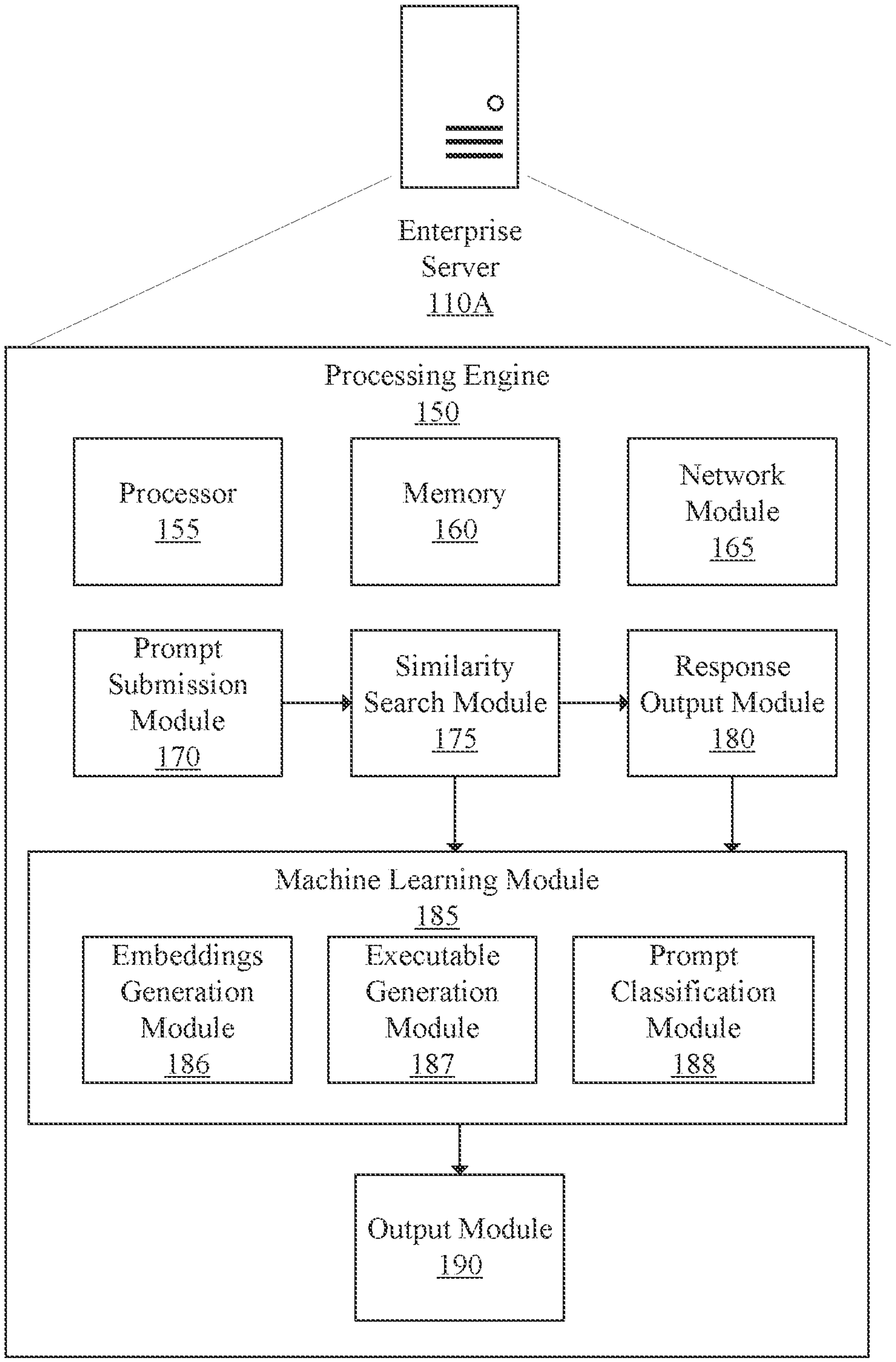
FIG. 1B is a diagram illustrating an exemplary computer system that may execute instructions to perform some of the methods therein.

FIG. 1B is a diagram illustrating an exemplary computer system that may execute instructions to perform some of the methods therein. The diagram shows an example of an intelligent, AI-based people analytics engine. Processing engine 150 may be an example of, or include aspects of, the corresponding element or elements described with reference to FIG. 1A. In some embodiments, processing engine 150 is a component or system on enterprise server 110A. In other embodiments, processing engine 150 may be a component or system on client device 100A-100N, or may be a component or system on peripherals or third-party devices. Processing engine 150 may comprise hardware or software or both.

Processing engine 150 may include processor 155, memory 160, network module 165, prompt submission module 170, similarity search module 175, response output module 180, machine learning module 185, embedding generation module 186, executable generation module 187, prompt classification module 188, and output module 190.

A processor 155 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 155 may be configured to operate a memory array using a memory controller. In other cases, a memory controller may be integrated into processor 155. The processor 155 may be configured to execute computer-readable instructions stored in a memory to perform various functions related to providing responses to people analytics prompts.

Memory 160 may include random access memory (RAM), read-only memory (ROM), or a hard disk. The memory 160 may be solid state or a hard disk drive, and may store computer-readable, computer-executable software including instructions that, when executed, cause a processor to perform various functions described herein. In some cases, the memory 160 may contain, among other things, a BIOS which may control basic hardware or software operation such as the interaction with peripheral components or devices. In some cases, a memory controller may operate memory cells as described herein.

Network module 165 functions to transmit and receive data and receive data from other computing systems via a network. In some embodiments, the network module 165 may enable transmitting and receiving data from the Internet. Data received by the network module 165 may be used by the other modules. The modules may transmit data through the network module 165.

Prompt Submission Module 170, Similarity Search Module 175, and Response Output Module 180 function to allow users to submit prompts, enable similarity searching for prompts, and generate response outputs for prompts, respectively, as will be described in further detail with respect to FIG. 2.

Machine learning module 185 functions to perform various machine learning, deep learning, and/or artificial intelligence tasks within the system. In some embodiments, the machine learning module 185 may constitute at least a portion of a generative AI system used in various embodiments. In some embodiments, machine learning module 185 may include one or more of embeddings generation module 186, executable generation module 187, and/or prompt classification module 188. Such functions will be described in further detail with respect to FIG. 2.

Output module 190 functions to provide response outputs to one or more client devices, as will be described further with respect to FIG. 2 below.

Figure 2:
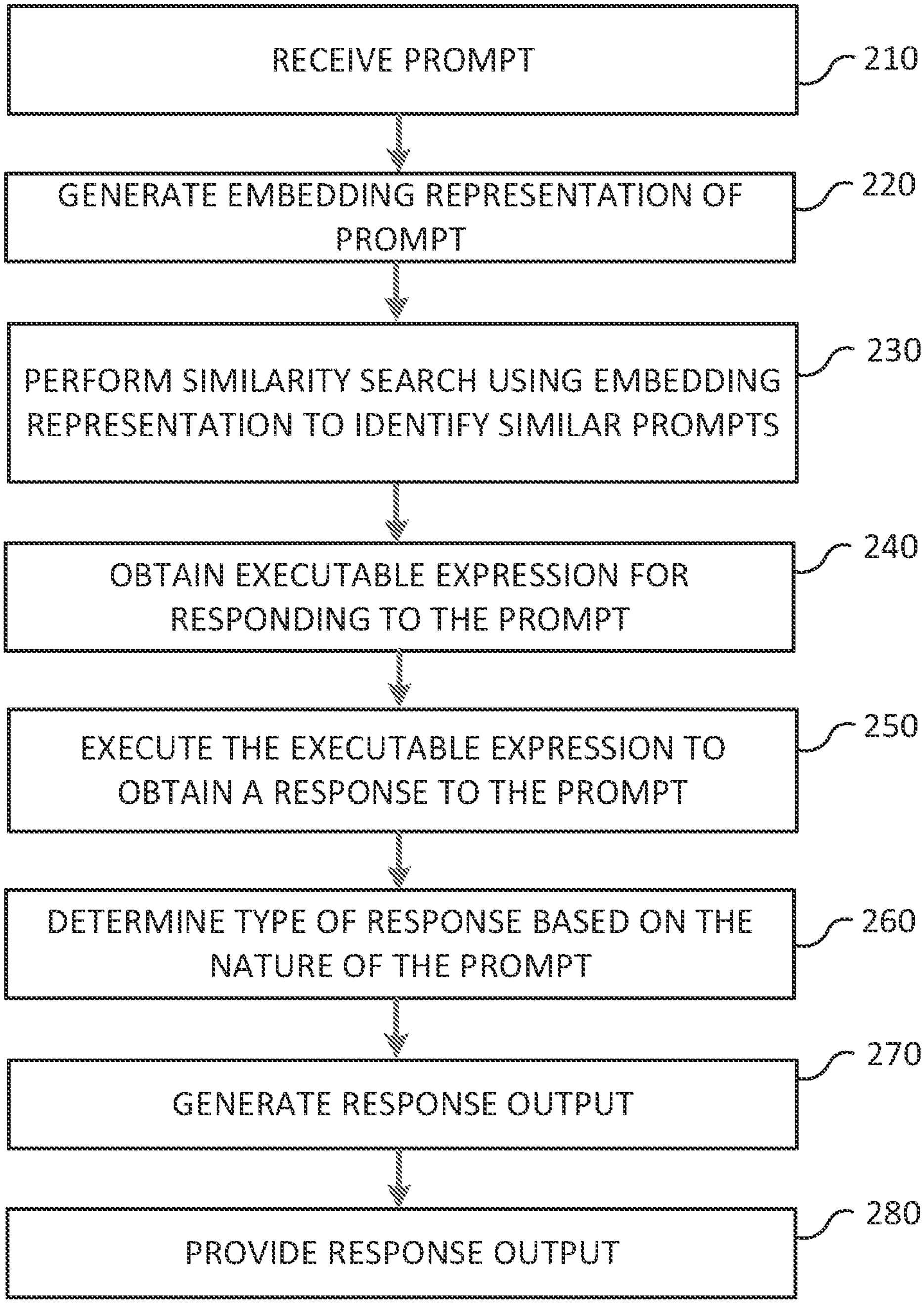
FIG. 2 is a flow chart illustrating an exemplary method that may be performed in accordance with some embodiments.

FIG. 2 is a flow chart illustrating an exemplary method that may be performed in accordance with some embodiments. The flow chart shows an example of a process for providing intelligent people analytics from generative AI. In some examples, these operations may be performed by a system including a processor executing a set of codes to control functional elements of an apparatus. Additionally or alternatively, the processes may be performed using special-purpose hardware. Generally, these operations may be performed in accordance with some aspects of the systems and methods herein. For example, the operations may be composed of various substeps, or may be performed in conjunction with other operations described herein.

At step 210, the system receives a prompt from a client device associated with a user. This enables users to interact with the system and obtain insights specifically related to people analytics.

In some embodiments, the received prompt is in natural language format, allowing users to express their prompts using everyday language and familiar language patterns, rather than formalized query languages or technical syntax. In some embodiments, to effectively process and understand the natural language input, the system leverages advanced natural language processing (hereinafter "NLP") techniques. It may employ state-of-the-art AI models, such as, e.g., transformer-based models, which are trained on large datasets to comprehend and interpret the semantics and intent behind the user's prompt accurately.

In some embodiments, the system's NLP capabilities enable it to analyze the received prompt, identify the key elements and context, and extract the underlying intent. This understanding forms the basis for generating a meaningful and relevant response that addresses the user's prompt related to people analytics.

The client device in question is used by the user. It may be one or more of various client devices, such as, e.g., smartphones, tablets, computers, or any other devices capable of connecting to the system's interface.

In some embodiments, the prompt submitted by the user is related in some way to people analytics. For example, In some embodiments, the system includes a user interface (hereinafter "UI") provided on a people analytics platform. This UI is accessible through the client device associated with the user, allowing the user to submit their prompts conveniently. The UI may comprise, for example, a web-based interface, a mobile application, or any other interface that enables users to interact with the system.

In various embodiments, through the UI, users can input their prompts using, e.g., a text input field or voice input functionality, depending on the capabilities of the client device. In various embodiments, the interface may also offer additional features to assist users in formulating their queries effectively, such as, e.g., auto-completion suggestions, prompt templates, or context-aware prompts.

In some embodiments, upon submitting the prompt through the UI, the system receives the prompt and initiates the subsequent steps of processing and generating a response, as will be described in later steps. The prompt, being in natural language format, may also be processed by the system's AI model(s) to extract its meaning, intent, and relevant parameters.

In some embodiments, the people analytics platform provides a dedicated space for users to interact with the system and access its functionalities. For example, users can access the platform from their client devices, log in to their accounts, and submit prompts directly through the interface. By integrating the user interface within the people analytics platform, the system ensures a seamless and cohesive experience for users. In some embodiments, users will be able to leverage the platform's broader capabilities, such as, for example, data visualization, report generation, and data exploration, while also benefiting from the open-ended prompt and response functionality. This integrated approach empowers users to have a comprehensive understanding of their workforce data and make data-driven decisions based on their specific prompts and requirements.

In some embodiments, the system categorizes prompts into different sets based on their topics or intents, updates the categorized prompts based on user input to improve the accuracy and relevance of the categorization, and then allows users to use the categories as a guide to quickly generate prompts related to specific topics. In various embodiments, the categories may include one or more of, e.g., employee retention, talent acquisition or recruiting, payroll, diversity inclusion, work culture, and more.

In various embodiments, to categorize the prompts, the system can utilize various techniques such as, e.g., NLP techniques, machine learning models, or predefined rule-based approaches. These techniques analyze the content and structure of the prompts to determine their respective topics or intents.

In some embodiments, the system continuously updates the categorized prompts based on user input to improve the accuracy and relevance of the categorization. This feedback mechanism allows the system to adapt and refine the categorization process over time. For example, if a user submits a prompt about employee attrition, and the system categorizes it under the "Retention" category, the user can provide feedback indicating that the prompt should be categorized as "Attrition" instead. The system then updates its categorization model to reflect this input, enhancing the accuracy of future categorizations.

In some embodiments, the system receives a prompt from a client device associated with a user that relates to a request for one or more recommendations. The system may be configured to provide insightful and actionable recommendations based on the received prompt and available data. For example, a user may submit a prompt like, "What are the top three recommendations to retain high-performing employees?" In response to this prompt, the system utilizes the generative AI model to analyze the prompt's context and generate recommendations based on patterns and insights derived from the data stored in the data warehouse.

In some embodiments, the system leverages machine learning algorithms to identify relevant factors and variables that contribute to the prompt's topic. It analyzes, e.g., historical data, performance metrics, employee feedback, and other relevant information to generate recommendations tailored to the organization's specific needs and challenges.

In various embodiments, the generated recommendations can cover a wide range of topics, such as, e.g., employee retention strategies, talent development initiatives, performance improvement methods, or succession planning approaches. The system may consider multiple factors, including, e.g., employee demographics, performance history, engagement levels, and/or market trends, to provide comprehensive and contextually relevant recommendations.

In some embodiments, the system may incorporate predictive analytics to anticipate future scenarios and offer proactive recommendations. For instance, if the received prompt is about predicting attrition risk for high-performing employees, the system can leverage historical data and machine learning models to identify potential risk factors and suggest proactive retention strategies.

In some embodiments, rather than the user manually submitting a prompt, the user is provided with a user interface in which a number of prompts are displayed. Such prompts may be example prompts, such as, e.g., follow-up prompts or suggested recommendations that the user may wish to submit in this session but hasn't submitted yet, that the generative AI system can suggest to the user. The user may optionally select one of these prompts to be submitted as the next prompt to be submitted. Thus, in some embodiments, one or more suggested prompts can be displayed for the user during the generative AI session. In some embodiments, one or more previous prompts from a prior session may be displayed to the user as a suggested prompt the user may wish to submit in the current session. For example, if the system determines that the current session is similar in context to a previous session, then the system may wish to provide a number of previous prompts from that previous session as options the user may be able to select.

At step 220, the system generates an embedding representation of the received prompt.

In some embodiments, the system employs a generative AI system incorporating one or more generative AI models to generate the embedding representation of the received prompt. In some embodiments, at least one of the generative AI models is based on a large language model. In some embodiments, at least one of the generative AI model utilizes embedding techniques to understand the semantic structure and context of the prompt, enabling it to capture the essence of the user's inquiry effectively.

In some embodiments, at least one of the generative AI models operates by processing the natural language prompt and transforming it into a dense numerical representation known as an embedding. This embedding captures the underlying meaning and nuances of the prompt, allowing for more accurate and context-aware responses. In some embodiments, the generative AI model may take the form of a large language model which has been trained on vast amounts of text data in order to enhance its ability to comprehend a wide range of prompts and provide insightful responses.

In some embodiments, at least one of the generative AI models is based on a transformer architecture. In various embodiments, any of a variety of other different transformer architectures may be contemplated and deployed for one or more of the generative AI models. In various other embodiments, any of a variety of non-transformer architectures may be contemplated and deployed for one or more of the generative AI models.

In some embodiments, in order to generate the embedding representation, the generative AI model may tokenize the received prompt into subword units or word-level tokens. These tokens are then processed through multiple layers of the model, where each layer extracts and refines different levels of linguistic information. The resulting embeddings are dense vector representations that encode the semantics and syntactic structure of the prompt.

In some embodiments, the generative AI system and one or more of the generative AI models may be fine-tuned or customized specifically for people analytics. In some embodiments, this fine-tuning process involves training the model on domain-specific data related to people analytics, such as, for example, human resources (hereinafter "HR") data, workforce metrics, or employee surveys. In some embodiments, by fine-tuning one or more of the generative AI models, they become more specialized in understanding and generating embeddings for different prompts in the context of people analytics, resulting in more accurate and tailored responses.

In some embodiments, the system can train one or more of the generative AI models using an initial training dataset generated by a general language model. The general language model provides a foundation for understanding and generating text, capturing a wide range of linguistic patterns and structures. Initially, a generative AI model is trained on a diverse set of textual data, which may include, e.g., books, articles, websites, and other sources of information. This training process enables the model to learn the intricacies of language and develop a deep understanding of various concepts and contexts. Once the initial training is complete, the generative AI model is specialized to generate executable expressions specifically tailored for responding to textual prompts from users. This specialization process involves further fine-tuning the model using a dataset that is specific to the domain of people analytics.

In some embodiments, the system can be configured to receive user feedback from one or more users on the responses provided by the one or more generative AI models during the training phase. Such feedback can be submitted by users, collected by the system, and used to improve the generative AI models. This feedback loop can be employed to enhance the accuracy and effectiveness of the generative AI models over time. In some embodiments, this user feedback aspect can lead to the available data used as sources for the system shifting over time as additional user feedback is received by the system. As the data shifts and is improved, the generative AI models can be continuously fine-tuned over time.

In some embodiments, the specialized training dataset can be curated from a variety of sources, such as, for example, industry-specific documents, employee records, organizational data, and past interactions with the system. The dataset may potentially include a wide range of prompts related to people analytics, allowing the generative AI model to learn how to generate accurate and relevant executable expressions in response to such queries. In some embodiments, the specialized training enables the generative AI model to adapt and evolve over time as new data and insights become available.

At step 230, the system performs a similarity search using embedding representation to identify similar prompts.

In some embodiments, the system performs a similarity search using the generated embedding representation to identify similar prompts that have been submitted before, if there are any. This enables the system to leverage previous knowledge and historical data, in order to provide relevant responses based on similar prompts, enhancing the efficiency and accuracy of the response generation process.

In some embodiments, to perform the similarity search, the system utilizes a database or repository of previously submitted prompts and their corresponding embeddings. In some embodiments, the system stores a collection of historical prompts and their embeddings in a dedicated storage system, such as a data repository or a distributed file system. In some embodiments, the system may store historical prompts and their corresponding embeddings in, for example, relational databases and/or vector databases.

In some embodiments, the similarity search employs advanced indexing techniques to efficiently search and retrieve similar prompts. For example, in some embodiments, the system may utilize approximate nearest neighbor (hereinafter "ANN") search algorithms, such as, e.g., locality-sensitive hashing (hereinafter "LSH") or k-d trees, to quickly identify a set of candidate prompts that are likely to be similar to the current inquiry. These techniques may function to reduce the search space and improve the efficiency of the retrieval process.

In some embodiments, once the candidate prompts are identified, the system compares their embeddings to the generated embedding representation of the current prompt. In some embodiments, various similarity metrics may be utilized, such as, for example, cosine similarity or Euclidean distance, to measure the similarity between embeddings. In some embodiments, the system may apply threshold-based filtering to exclude prompts with similarity scores below a certain threshold, ensuring that only highly similar prompts are considered.

In some embodiments, in addition to comparing the embeddings, the system may take into account other factors, such as, for example, the relevance of the prompts provided for the similar prompts in the past or the recency of the previous prompts. This allows the system to prioritize and rank the similar prompts based on their relevance and usefulness in providing accurate responses.

For example, if a user submits the prompt, "What is the employee turnover rate in the sales department?", the system can leverage the generated embedding representation to identify similar prompts such as, e.g., "What is the attrition rate for the sales team?" or "How many employees have left the sales department this quarter?" By retrieving and analyzing the responses provided for these similar prompts, the system can generate a more precise and tailored response to the user's inquiry.

In some embodiments, the system performs the similarity search by comparing the generated embedding representation of the received prompt with pre-existing embedding representations of previously submitted prompts stored in a vector database. This can enable the system to identify similar prompts that have been submitted before and leverage the corresponding responses to those similar prompts to provide accurate and relevant responses for currently received prompts.

In various embodiments, the vector database can be constructed using techniques such as, e.g., word embeddings, sentence embeddings, or other embedding models that encode the semantic meaning of the prompts. Each prompt in the database can be represented as a vector in a high-dimensional space, capturing its inherent characteristics. During the similarity search process, the system compares the generated embedding representation of the received prompt with the pre-existing embedding representations in the vector database. In some embodiments, various similarity metrics can be employed, such as, e.g., cosine similarity or Euclidean distance, to measure the similarity between the vectors.

In some embodiments, the system retrieves a set of similar prompts by selecting the top-k nearest neighbors based on the similarity scores. These similar prompts can serve as a resource for generating responses to the received prompt or providing insights based on historical data.

At step 240, the system obtains an executable expression for responding to the prompt. In some embodiments, the system may obtain the executable expression by either retrieving it or generating it, depending on whether a similar prompt has been identified for the prompt.

In some embodiments, the system determines whether a similar prompt has been identified and, based on this determination, retrieves or generates an executable expression for responding to the received prompt. In some embodiments, if a similar prompt is identified through the similarity search, the system then retrieves, or attempts to retrieve, a pre-existing executable expression that corresponds to the similar prompt. In some embodiments, the executable expression can be stored in a knowledge base or a repository of predefined responses. In various embodiments, the executable expressions are represented using, e.g., a markup language, scripting language, or query language, enabling the system to interpret and execute them to generate the desired response.

In some embodiments, if no similar prompts are identified, or if the similar prompts found do not have a validated executable expression to respond to the prompt, the generative AI system is used to generate the executable expression. This amounts to the system generating a new executable expression dynamically and automatically. In various embodiments, this can be achieved by employing a rule-based or machine learning-based approach. For example, the system may utilize, e.g., an NLP model to analyze the received prompt, extract key information, and generate a dynamic executable expression that addresses the user's prompt.

In some embodiments, first, the type of the prompt is determined, such as whether it is a prompt about, for example, a list of employees, a chart, or a summary number. This helps in providing different responses to the prompt. Second, one or more of the generative AI models is utilized to generate an executable expression that responds to the prompt.

The retrieved or generated executable expression contains the necessary instructions for obtaining the response to the received prompt. In various embodiments, these instructions can involve, e.g., querying a data warehouse, accessing relevant databases or data sources, performing calculations or analyses, and/or aggregating the results. The executable expression encapsulates the steps required to process the prompt and derive the response.

In some embodiments, the system may incorporate additional optimization techniques to enhance the retrieval or generation of the executable expression based on various factors. In some embodiments, one such factor is the complexity of the prompt posed by the user. The system may employ a complexity analysis algorithm to assess the level of intricacy in the prompt and adjust its approach accordingly. For instance, if the prompt involves complex data manipulations or requires extensive computation, the system may prioritize efficient algorithms or parallel processing techniques to optimize the execution of the expression.

In some embodiments, one such factor in optimizing the retrieval or generation of the executable expression is the availability of relevant data. In some embodiments, the system may assess the accessibility and reliability of the required data sources before selecting the most suitable approach. For example, if the necessary data is readily available in a well-structured database, the system may choose a direct query-based approach to retrieve the information efficiently. On the other hand, if the data is obtained across multiple sources or is incomplete, the system may employ data integration or data imputation techniques to ensure accurate and comprehensive results.

In some embodiments, the computational resources required for executing the expression may play a crucial role in optimization. In various embodiments, the system may consider factors such as, e.g., the processing power, memory, and/or network bandwidth available at the time of prompt execution. Based on these resource constraints, the system can dynamically allocate resources or adjust the execution strategy to achieve optimal performance. For example, if the computational resources are limited, the system may prioritize lightweight algorithms or employ data sampling techniques to provide approximate but timely responses.

At step 250, the system executes the executable expression to obtain a response to the prompt. The system utilizes a data warehouse comprising one or more data sources to execute the generated executable expression and obtain a response to the received prompt.

In some embodiments, the data warehouse acts as a centralized repository that integrates and stores relevant data from various sources, such as, for example, HR databases, performance management systems, and employee surveys, among others. By leveraging the data warehouse's capabilities, the system can access a comprehensive and up-to-date pool of information necessary for analyzing and responding to people analytics questions.

In some embodiments, the data warehouse employs a robust prompt processing engine capable of efficiently executing the executable expression. In some embodiments, this engine may utilize prompt optimization techniques, such as, for example, prompt rewriting, indexing, and caching, to expedite the retrieval and processing of relevant data. For example, in response to a prompt regarding employee attrition rates, the system can formulate an optimized prompt that leverages precomputed statistics or indexes within the data warehouse to quickly obtain the required information.

In some embodiments, the data warehouse may employ distributed computing techniques to manage large-scale data processing and enable parallel execution of the executable expression. This allows the system to leverage the computing power of multiple servers or nodes within the data warehouse infrastructure. For example, when dealing with complex prompts involving extensive data analysis or predictive modeling, the system may distribute the computation across multiple nodes, thereby accelerating the execution process and improving responsiveness.

In some embodiments, the data warehouse may support real-time data integration capabilities, enabling the system to access and analyze streaming data sources. For example, the system can continuously monitor employee sentiment data from social media platforms or real-time performance metrics from operational systems. By integrating these dynamic data sources into the data warehouse, the system can provide timely insights and responses to questions informed by up-to-date, current data.

In some embodiments, the system implements one or more access controls that are configured to control the permissions of AI-generated executable expressions to the data warehouse. These access controls are designed to maintain data integrity. In some embodiments, by configuring the access controls, the AI-generated executable expressions are granted read-only access permissions to the data warehouse. This means that the expressions can retrieve and extract information from the data warehouse to generate responses to user queries, but they are restricted from modifying or altering the data. In some embodiments, the user is associated with a certain role that is provided access to only certain attributes or information about certain employees (for example, a user may be provided access to information about all employees except those in the payroll department). In some embodiments, the system is configured to provide responses to a user with only a specific view into the data the user has permissions to access. In some embodiments, an authorized administrator may have the ability to change the user's access. This may be, for example, an ability to change a user's access in terms of attributes (e.g., columns), employees (e.g., rows), or some other fashion.

In various embodiments, the access controls can be implemented using various techniques and mechanisms. In some embodiments, in a cloud computing environment, access control policies and role-based access control (hereinafter "RBAC") can be utilized to define and enforce the permissions of the AI-generated expressions. In some embodiments, the access controls can be customized based on specific user roles or privileges. For example, different levels of access permissions can be granted to, e.g., administrators, analysts, or general users, ensuring that each user has appropriate access to the data warehouse.

In some embodiments, the system utilizes various data sources within the data warehouse to execute the executable expression and obtain a response to the received prompt. These data sources may comprise one or more systems commonly found in organizations, such as, e.g., human resource information systems (hereinafter "HRIS"), calendaring systems, electronic learning and development (hereinafter "e-learning") systems, and payroll systems. In some embodiments, these data sources may be enterprise systems which are integrated into the data warehouse. Examples of commercial enterprise systems which may be integrated in various embodiments include, e.g., Workday, SAP, ADP, and Office 365.

In some embodiments, an HRIS data source, for example, may store comprehensive employee data, including, for example, demographics, employment history, performance evaluations, and/or compensation details. In some embodiments, one or more calendaring systems is integrated into the data warehouse as data sources, allowing the system to access and analyze, e.g., employee schedules, meetings, and/or attendance records. This enables the system to provide insights into, for example, employee availability, meeting patterns, or time allocation within the organization. In some embodiments, one or more e-learning systems can be leveraged as data sources within the data warehouse. Such e-learning systems can contain information about, for example, employee training courses, certifications, and/or skill development programs. By utilizing this data, the system can offer responses to prompts related to employee training history, skill profiles, or recommended learning opportunities. In some embodiments, one or more payroll systems, which manage, e.g., employee compensation and benefits, among other payroll aspects, can also be integrated as data sources within the data warehouse. This allows the system to provide responses to prompts concerning, for example, salary information, benefits packages, or payroll-related inquiries.

In various embodiments, the system may include various additional data sources or systems specific to the organization's needs, such as, e.g., performance management systems, employee feedback platforms, or customer relationship management (hereinafter "CRM") systems.

In some embodiments, the executable expression contains, at least in part, instructions for the system to query the data warehouse to retrieve relevant information from one or more data sources. In some embodiments, the system may generate one or more structured query language (hereinafter "SQL") statements in order to query the data warehouse. In some embodiments, the system may generate an Elasticsearch query. In some embodiments, the system makes a determination on which type of query to generate, and which table to query from the data warehouse. For example, the determination can include generating an SQL query if information relating to certain types of data are requested or necessary to respond to the prompt, and generating an Elasticsearch query if information relating to certain other types of data are requested or necessary to respond to the prompt. In addition, the generative AI can be provided with one or more table definitions relating to tables in data sources or in the data warehouse. The system then attempts to match the natural language input for the prompt to the correct or most accurate query, as well as to the right data warehouse or data source where the needed table is stored. In some embodiments, multiple tables or indices are used for different types of information. For example, the data warehouse can include a table for meeting information, a table for employee records, a table for payroll, and more. If the user submits a prompt relating to payroll, for example, then the payroll table can be queried.

At step 260, the system determines a type of response based on the nature of the prompt. In some embodiments, the system utilizes the generative AI system to perform this determination. In various embodiments, the system may incorporate various techniques and methodologies to accurately analyze and understand the prompt's intent and context, allowing it to provide an appropriate and relevant response to the user.

In some embodiments, the system makes use of NLP techniques that employ semantic analysis and syntactic parsing in order to comprehend the structure and meaning of the prompt. For example, by analyzing the prompt's linguistic patterns, keywords, and/or contextual cues, the system can categorize it into different response types, such as, e.g., factual, descriptive, comparative, or predictive. For example, if the prompt asks for a specific number or statistic, the system can identify it as a factual response type and thereafter provide a precise numerical response.

In some embodiments, the system utilizes machine learning techniques to train models specifically tailored to identify the types of responses based on the nature of the prompts. These models are trained on a labeled dataset comprising various prompt types and their corresponding response types. By leveraging this training data, the system can make accurate predictions about the appropriate response type for a given prompt. For example, the system may identify a prompt asking for recommendations as requiring a response type focused on providing actionable suggestions or insights.

Additionally or alternatively, in some embodiments, the system incorporates contextual analysis to determine the type of response. It considers factors such as, for example, the user's role, department, historical interactions, and/or preferences to tailor the response accordingly. For example, if the user is a manager in the sales department, the system may provide a response that highlights sales-specific metrics, challenges, or best practices.

At step 270, the system generates a response output via the generative AI system. The response output is based on the determined type of the response to the received prompt. Once the system has identified the appropriate response type, it can leverage this information along with the obtained response in order to generate a comprehensive and informative response for the user.

In some embodiments, the system generates a textual response output that directly addresses the user's prompt. For example, if the determined response type is descriptive, the system may generate a response in natural language format that provides detailed information and explanations related to the prompt. The generated response may include specific data points, trends, or analysis relevant to the prompt, enabling the user to gain a comprehensive understanding of the topic.

In some embodiments, the system may go beyond textual responses and provide visual representations of data as part of the response. For instance, if the determined response type is comparative or involves presenting statistical data, the system may generate visual representations of the data such as charts, graphs, or diagrams to enhance the user's understanding. In some embodiments, the user may explicitly request a form of visual representation within the prompt, and the generative AI system can be trained to take this into account in determining whether and which visual representations of data to generate for the response output.

In some embodiments, the system may provide interactive response outputs that allow users to explore and navigate the information further. For example, if the determined response type involves recommending actions, the system may generate a response that includes interactive elements such as, e.g., clickable links, buttons, or menus. Users can then interact with these elements to access additional insights, related reports, or drill-down into specific areas of interest.

In some embodiments, the system can personalize the response output based on user preferences and profiles. In some embodiments, it takes into account the user's historical interactions, feedback, and/or preferences to tailor the response format. For example, if a user has indicated a preference for visual representations, the system may prioritize generating response outputs that include charts or infographics.

In some embodiments, a separate generative AI model from the other generative AI models used herein is used for generating the response output. In some embodiments, the generative AI model performs a classification to determine whether the response output should be a particular form of visual data or textual input. For example, the system may determine that the response output should be, e.g., a pie chart, a bar chart, a paragraph, a number, or a percentage. The system can perform this classification, and based on this classification, the system can then generate the response output. For example, if the system classifies that the type of prompt is related to asking for pay distribution by gender, then the system may generate the response output as a pie chart. Conversely, if the system classifies that the type of prompt is asking for a number, such as the prompt, "how many employees are there?", then the system may generate the response output as, e.g., a number, a sentence with a number included within, or a response that includes visual data such as a chart or graph with the numerical data represented. For example, one response to the prompt above may be, "Currently, your organization includes 123 employees. Please note that this figure only includes employees according to your permissions", while another response may be simply the number 123.

In some embodiments, the system can adaptively learn and improve its response type determination over time. In some embodiments, the system employs user feedback mechanisms and one or more feedback elements within a UI, whereby users can manually rate, e.g., the relevance, accuracy, and/or effectiveness of the provided responses. The system then can incorporate this feedback to refine its generative AI model(s), thereby enhancing the system's ability to accurately determine the appropriate response type for future prompts. In some embodiments, the system first collects user feedback on the provided response output, then retrains and updates the generative AI model using the collected user feedback in order to improve the generative AI model over time.

In some embodiments, the generative AI system includes at least one general purpose large language model (hereinafter "LLM"), and one or more specialized language models. In some embodiments, the system is configured such that submitted prompts are first fed as input to an LLM. The LLM generates a response output and determines a type of response that would be ideal for the nature of the prompt, for example, a pie chart, bar chart, number, percentage, or sentence. In some embodiments, a human then manually evaluates the response output and type of response determined by the LLM. In some embodiments, the human can quickly manually evaluate responses, as the LLM may be trained to respond correctly in most cases with occasional errors being generated. The human manually annotates the response from the LLM. In some embodiments, this annotation can then be used as training data in a dataset that is utilized to train one or more specialized language models. This training data can be used to fine-tune the specialized language model for one specific task. For example, one specialized language model may be fine-tuned specifically for responding to recruitment-related prompts, another may be fine-tuned specifically for responding to employee attrition prompts, another may be fine-tuned specifically for responding to diversity and inclusion prompts, and so forth. The outcome of this fine-tuning is that the specialized language models may now be trained to provide equally accurate or better responses than the LLMs for their specific tasks.

In some embodiments, upon receiving a submitted prompt, the trained specialized language model then serves the response output. If the response is evaluated (e.g., by a user submitting feedback) to then be the correct response, then no further action to fine-tune is taken. In some embodiments, if the response is evaluated to be incorrect, then the system sends the prompt to the LLM, the LLM generates a response, a human manually evaluates and annotates the response, and the response is saved in a database. In some embodiments, this cycle continues to iterate over time. While the cycle continues, the specialized language model is iteratively fine-tuned and improves its responses in its single specific task over time.

At step 280, the system provides the response output to the client device associated with the user.

In some embodiments, the response output is transmitted directly to the client device associated with the user via a network connection. The system may utilize various communication protocols and technologies to transmit the response, such as, e.g., HTTP, WebSocket, or other suitable protocols. The response can be sent in a structured format, ensuring compatibility with different client devices and enabling easy parsing and display of the information.

In some embodiments, the system provides the response output through a dedicated UI specifically designed for the people analytics platform. The UI may be accessible through, e.g., a web browser, a mobile application, or other client-specific interfaces. Users can interact with the interface to submit queries, receive responses, and explore additional features and functionalities.

In some embodiments, the system leverages push notification mechanisms to deliver the response output in a timely manner. For example, if the user is currently offline or not actively using the client device, the system can store the response and send a notification to the device once the user reconnects or becomes active. This ensures that users receive their responses even when they are not actively engaged with the system.

In some embodiments, the system may provide options for customizing the delivery of response outputs. Users can choose their preferred communication channels or notification preferences, such as, for example, email, SMS, or instant messaging applications. This allows users to receive the response output in a manner that aligns with their communication preferences and ensures a seamless integration into their existing workflows.

In some embodiments, the system provides the response output through an Application Programming Interface (hereinafter "API") endpoint, enabling users to access the open-ended prompt and response system programmatically. The API endpoint can serve as a gateway for users to interact with the system, allowing seamless integration into various applications, platforms, or services. In some embodiments, by exposing an API endpoint, the system provides a flexible and scalable means for users to leverage the capabilities of the open-ended prompt and response system. In various embodiments, users can send HTTP requests to the API endpoint, specifying their prompt and receiving the corresponding response as a structured data format, such as, e.g., JSON or XML.

For example, a user can utilize the API endpoint to submit a prompt, such as "What is the attrition rate of our company in the last quarter?" The system processes the prompt, generates an appropriate response, and returns it to the user through the API response.

In some embodiments, the API endpoint supports various authentication mechanisms to ensure secure access to the system. In some embodiments, users may be required to provide authentication credentials, such as, e.g., API keys or tokens, to authenticate their requests and establish a trusted connection with the system.

In some embodiments, the API endpoint can offer additional functionalities beyond simple prompt-response interactions. In various embodiments, the API allows users to retrieve, e.g., historical data, generate analytics reports, or perform advanced queries related to people analytics.

In some embodiments, the system maintains a conversation context by tracking the history of user interactions and response outputs, and then generates follow-up responses to follow-up prompts based on the conversation context and utilizing the generative AI model to generate appropriate response outputs to the follow-up prompts. In some embodiments, to maintain the conversation context, the system can store the history of user interactions, including the prompts submitted by the user and the corresponding response outputs provided by the system. This historical information forms a knowledge base that can be leveraged to understand the user's intent and provide more personalized and accurate responses.

In some embodiments, the system utilizes the conversation context to generate follow-up prompts. Based on the previous interactions and the current state of the conversation, the system can identify areas where further clarification or elaboration is required. In some embodiments, to generate appropriate response outputs to the follow-up prompts, the system can utilize the same generative AI model employed for processing the initial prompt. By leveraging the contextual information from the conversation history, the model can generate responses that build upon previous interactions.

For example, if the user initially asks about the headcount of the sales department and receives a response, the user may subsequently submit a follow-up prompt like "What is the headcount breakdown by region?" or "Are there any upcoming hiring plans for the sales team?" The system can thus utilize the generative AI model to generate accurate and relevant response outputs specific to these follow-up prompts.

In some embodiments, the system monitors the performance of the generative AI model being used. In some embodiments, this monitoring is performed via a centralized server that serves AI models and provides a comprehensive platform for tracking and analyzing the model's performance. In various embodiments, the centralized server continuously, periodically, or semi-periodically collects data on various performance metrics of the generative AI model, such as, e.g., accuracy, response time, and resource utilization. This data can be obtained from various sources, including, for example, user feedback, system logs, and/or performance monitoring tools. By monitoring the performance, potential issues or limitations of the generative AI model can be identified. For example, if the model exhibits a decline in accuracy or slow response times, it may indicate the need for optimization or model retraining.

In some embodiments, the monitoring process may involve the system analyzing the performance data using machine learning techniques and/or statistical methods. This analysis can provide insights into the strengths and weaknesses of the generative AI model, allowing for targeted improvements and refinements. In some embodiments, based on the results of the monitoring and analysis, the generative AI model can be refined to enhance its performance. This refinement process may involve, e.g., updating the model's architecture, adjusting hyperparameters, incorporating additional training data, or employing transfer learning techniques. For example, if the monitoring reveals that the model is struggling to provide accurate responses to certain types of prompts, the training dataset can be augmented with specific examples related to those prompt types.

In some embodiments, multiple generative AI models may be utilized for different tasks, or even for one specific task. In some embodiments, the system performs monitoring of the generative AI models to track their accuracy, and then deploys the generative AI model with the highest accuracy among the models for the task. In some embodiments, the system may determine which model to employ based on which specific category the prompt falls under. For example, if the prompt is related to payroll, the system may employ one model, while if the prompt is instead an employee retention prompt, then the system may employ a different model. As such, the system may be configured to multiplex multiple different generative AI models. In order to achieve this, the system may be configured to track different models and retrieve some metric of their accuracy, such as, e.g., a percentage, value, ranking, score, or other quantitative measure of accuracy.

Figure 3A:
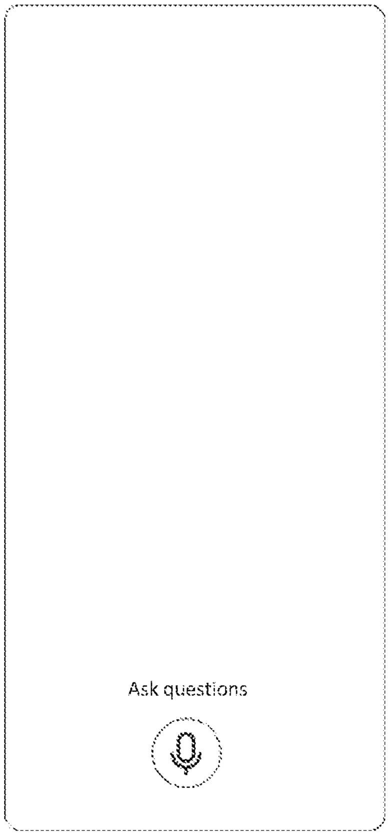
FIG. 3A is a diagram illustrating an example embodiment of a portion of a user interface for prompts to be submitted via voice input during a generative AI session.

FIG. 3A is a diagram illustrating an example embodiment of a portion of a user interface for prompts to be submitted via voice input during a generative AI session. In the illustrated UI, a user may connect to a generative AI session via a personal or mobile device, such as, e.g., a smartphone. Within the smaller screen of such a device, the user is provided with the ability to submit prompts via voice input. A user may submit analytics prompts and receive support for audio input. In some embodiments, when a user submits a prompt via audio, the system can be configured to automatically render a vocalized or spoken version of the output by audio. In some embodiments, one or more text to speech techniques or algorithms may be used to perform this rendering.

Figure 3B:
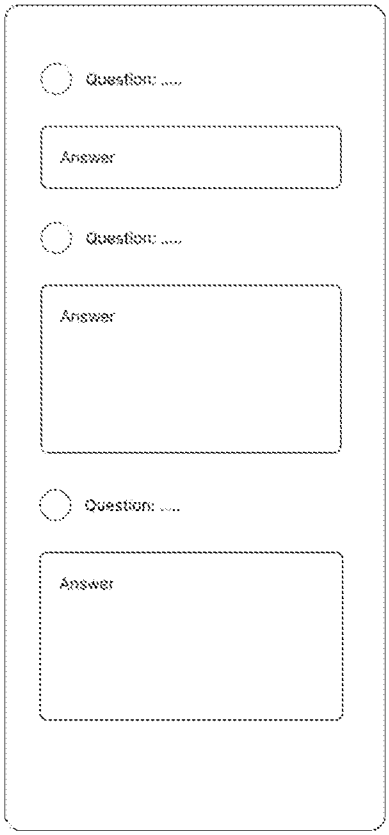
FIG. 3B is a diagram illustrating an example embodiment of a portion of a user interface for prompts and responses to be displayed during a generative AI session.

FIG. 3B is a diagram illustrating an example embodiment of a portion of a user interface for prompts and responses to be displayed during a generative AI session. In the illustrated example, a user has using audio input to submit a number of prompts within a generative AI session. For each prompt, the user has received a corresponding follow-up response that was generated by the generative AI system which consists of one or more trained generative AI models. In some embodiments, each response generated by the generative AI system is automatically rendered as audio output so that the user can hear the output as a generated vocalization.

Figure 4:
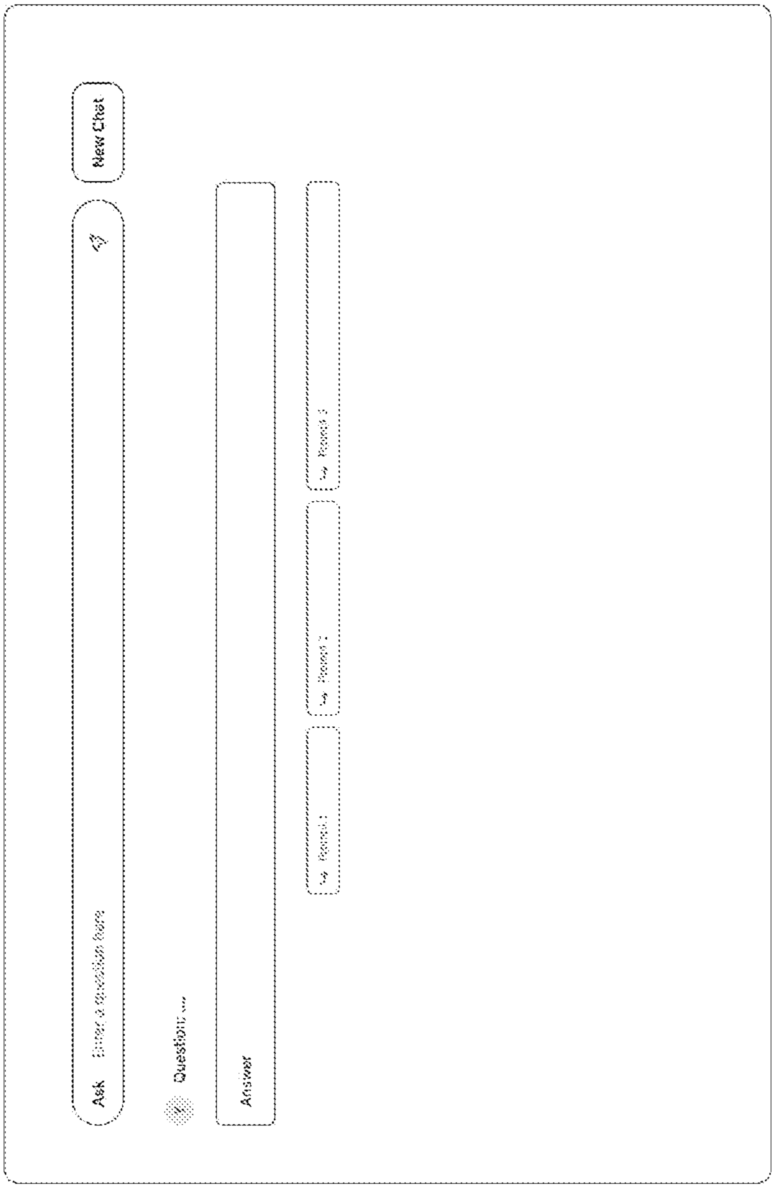
FIG. 4 is a diagram illustrating an example embodiment of a portion of a user interface for a generative AI session that enables a chat-like conversational experience.

FIG. 4 is a diagram illustrating an example embodiment of a portion of a user interface for a generative AI session that enables a chat-like conversational experience. The illustration demonstrates an embodiment wherein the user is presented with a text input field whereby the user may enter textual input and submit it as a prompt to the generative AI system. Below this field, a prompt and a response are displayed, which can represent, for example, a previous question and a previous answer within the same open generative AI session. This previous conversation can be exposed and displayed to the user in the UI so that the user is able to have visibility into what they have already submitted and what the user may have conversational context for. Below this question and answer, a number of prompts are additionally displayed in the illustration. Such prompts may be example prompts, such as follow-up questions to a previously asked question, that the generative AI system can suggest to the user. The user may optionally select one of these prompts to be submitted as the next prompt to be submitted. Thus, in some embodiments, the previous conversation and one or more suggested prompts can be displayed for the user during the generative AI session. Additionally, the user may select the "New Chat" UI element in order to generate a new chat session with no previous conversation history or conversational context. In some embodiments, using this chat-like conversational UI and user experience, the user may potentially interact with a wide range of different systems, backends, databases, and more. In some embodiments, this UI contains no pre-built dashboard filter, buttons, or other indirect methods of interacting with the generative AI system. Instead, the user is enabled to have direct interaction with the generative AI system.

Figure 5:
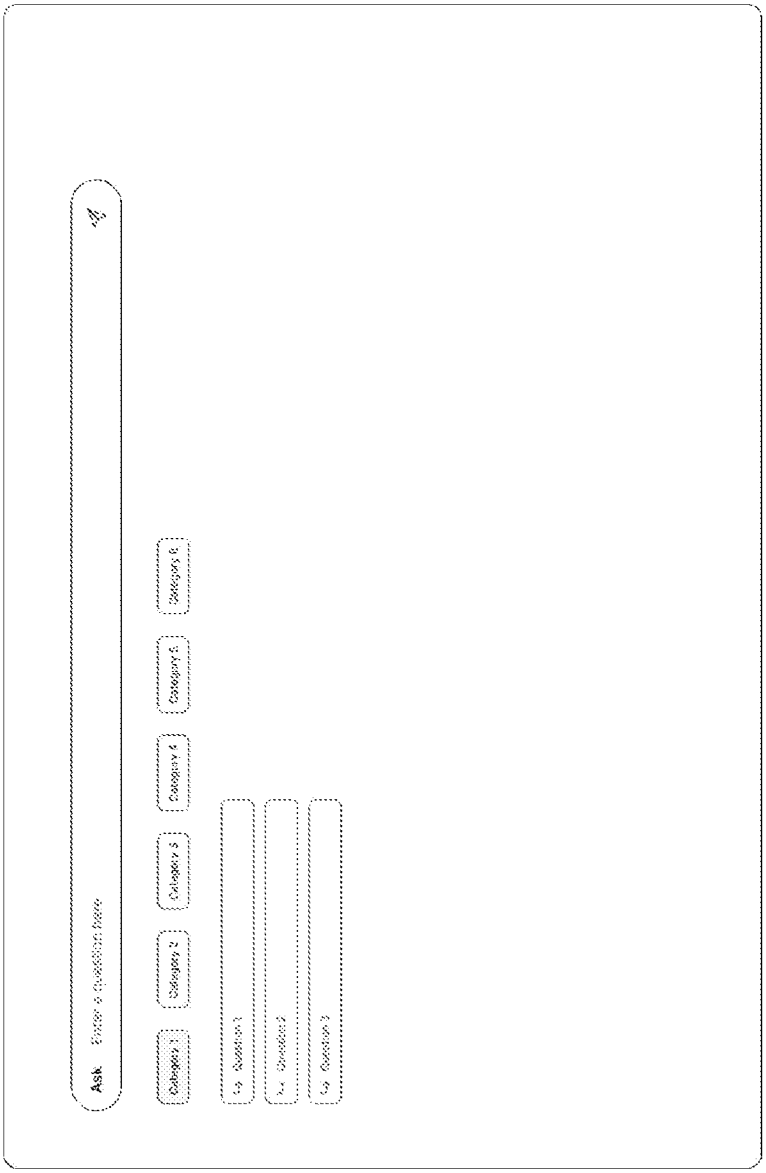
FIG. 5 is a diagram illustrating an example embodiment of a portion of a user interface for a generative AI session that enables categorizing of different sets of prompts.

FIG. 5 is a diagram illustrating an example embodiment of a portion of a user interface for a generative AI session that enables categorizing of different sets of prompts. In the illustrated example, a text input field is displayed to the user in the UI, along with a button to submit text input, similar to the illustration in FIG. 4. Below this text input field, a number of categories are displayed to the user. In some embodiments, the system can categorize different sets of prompts as categories, such as, e.g., prompts related to workforce planning, retention, diversity, equity, and inclusion ("DEI"), and more. The system is then configured to update the categories with user input as the user inputs more prompts which fall under one or more categories. In some embodiments, users may be able to use the categories as a guide to quickly submit prompts they want to receive responses to.

Figure 6:
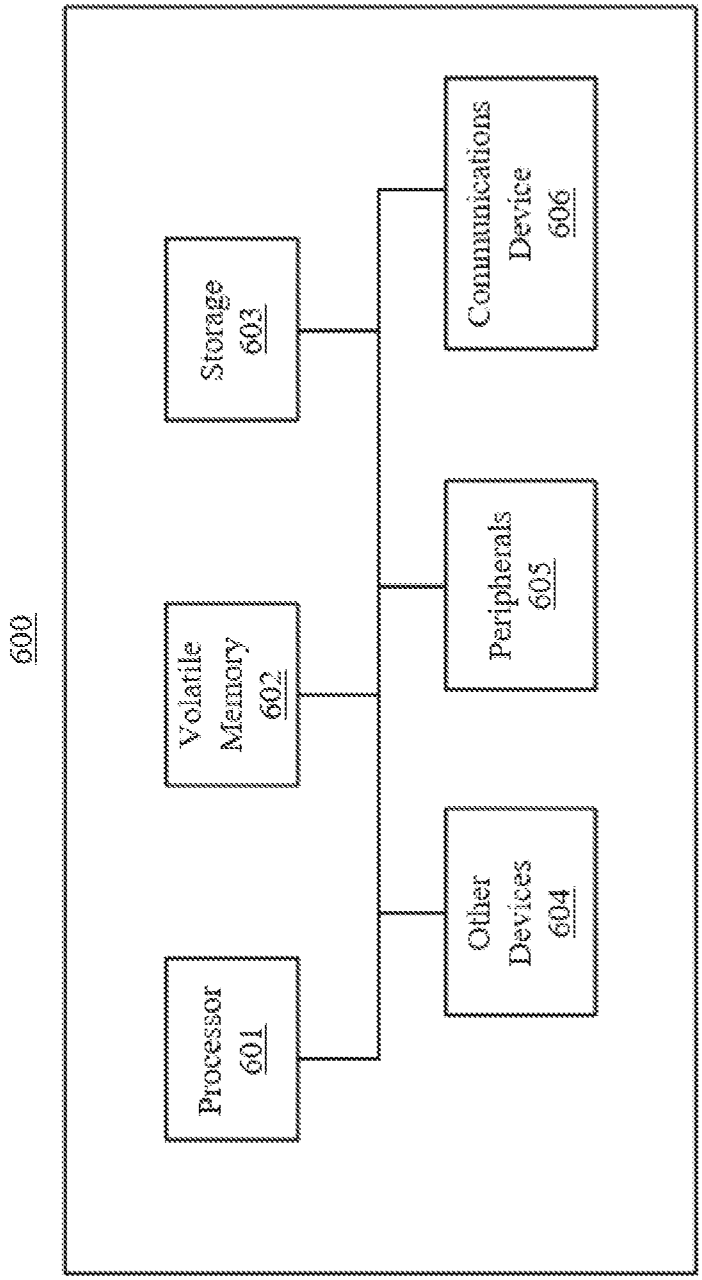
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium 610 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method, comprising:

training one or more large language models of a generative AI system on domain-specific data comprising human resources data, wherein the trained one or more large language models generate embeddings in the context of people analytics;

providing, as an input to the one or more large language models of the generative AI system, table definitions relating to tables in a data warehouse, wherein the table definitions comprise a table definition for employee records;

receiving a prompt from a client device associated with a user, wherein the prompt is related to a text input or a voice input from the client device, and wherein the prompt is in natural language format;

providing a form of the received prompt and contextual information to a first large language model of the generative AI system;

obtaining, from the generative AI system, an embedding representation of the received prompt by tokenizing the received prompt into subword units or word-level tokens, that are processed through multiple layers of the first large language model, wherein each of a layer of the first large language model extracts different levels of linguistic information, wherein the embedding representation of the received prompt is a vector representation that encodes semantics and syntactic structure of the received prompt;

obtaining, from the generative AI system, an executable expression for responding to the received prompt, wherein the executable expression is in the form of a query that is described in a query language, and wherein the one or more large language models of the generative AI system matches the form of the received prompt to one or more tables of the table definitions that were provided as an input to the one or more large language models, and the generative AI system generates the executable expression based on the matched one or more tables, to be used for the query;

executing the obtained executable expression to query the data warehouse comprising one or more data sources to obtain data for a response to the received prompt, the one or more data sources including employee data;

determining, by inputting the received prompt into the generative AI system, and generating a type of response to be generated based on the received prompt, wherein the type of response to be generated is classified, via the generative AI system, as either a visual graphic output or a textual output, wherein the visual graphic output comprises a chart, a graph or a diagram;

determining a context of the user that submitted the received prompt, wherein the context comprises a user's department;

generating, by a second large language model of the generative AI system that is distinct from the first large language model, based on the determined context of the user and the data obtained from executing the executable expression, a response output corresponding to the determined type of response to be generated; and providing the response output to the client device associated with the user.

2. The method of claim 1, wherein obtaining an executable expression for responding to the received prompt comprises:

storing in a vector database previously submitted prompts and their corresponding embeddings;

performing a similarity search using the obtained embedding representation to identify whether the received prompt is similar to one of the previously submitted prompts, wherein performing the similarity search comprises:

(i) applying an approximate nearest neighbor search algorithm comprising locality-sensitive hashing or a k-d tree to identify, from the previously submitted prompts, a set of candidate prompts and thereby reduce a search space of the similarity search, and (ii) comparing the corresponding embeddings of the candidate prompts to the obtained embedding representation using a similarity metric comprising cosine similarity or Euclidean distance;

selecting a similar previously submitted prompt based on a similarity score;, wherein selecting the similar previously submitted prompt comprises ranking the candidate prompts based on the similarity score and on one or more additional factors comprising a recency of the previously submitted prompts or a relevance of one or more responses previously provided for the previously submitted prompts;

when a similar previously submitted prompt is selected via the similarity search, then retrieving for execution as the obtained executable expression the selected similar previously submitted prompt.

3. The method of claim 2, wherein obtaining an executable expression for responding to the received prompt comprises:

storing in a vector database previously submitted prompts and their corresponding embeddings;

performing a similarity search using the obtained embedding representation to identify whether the received prompt is similar to one of the previously submitted prompts or of a predefined prompt used to generate a particular response;

retrieving, from the vector database, a set of similar prompts based on a similarity score, and excluding prompts that having a similarity scores below a certain threshold;, wherein retrieving the set of similar prompts comprises selecting a top-k number of nearest neighbors to the obtained embedding representation based on the similarity score;

based on the performed similarity search, determining that a similar prompt has been identified; and receiving an executable expression for responding to the received prompt, the executable expression corresponding to the identified similar prompt, wherein the executable expression comprises a markup language, a scripting language, or a query language and comprises instructions for performing calculations.

4. The method of claim 2, further comprising:

determining that the type of response is comparative or involves presenting statistical data;, wherein the determining comprises analyzing, using natural language processing comprising semantic analysis and syntactic parsing, one or more of a linguistic pattern, a keyword, or a contextual cue of the received prompt;

based on the determined type of response being comparative or involves presenting statistical data, generating the response output wherein the type of response comprises a response with one or more visual representations of data comprising charts, graphs or diagrams.

5. The method of claim 2, further comprising:

collecting user feedback on the provided response output;, wherein collecting the user feedback comprises providing one or more feedback elements within a user interface by which the user rates a relevance, an accuracy, or an effectiveness of the provided response output; and retraining and updating at least a subset of the generative AI models using the collected user feedback in order to improve the generative AI system over time, wherein the user feedback is used as available data used as sources for the generative AI system, such that the available data used as sources shifts over time as additional user feedback is received and the at least a subset of the generative AI models is continuously fine-tuned.

6. The method of claim 2, further comprising:

determining that a response type involves recommending actions;

identifying, via the generative AI system, one or more relevant factors or variables that contribute to a topic of the received prompt by analyzing one or more of historical data, performance metrics, or employee feedback obtained from the data warehouse;

applying predictive analytics to the one or more relevant factors or variables to anticipate a future scenario, and generating, based on the anticipated future scenario, a proactive recommendation, wherein the predictive analytics comprises applying one or more machine learning models to identify one or more risk factors and the proactive recommendation comprises one or more suggested actions responsive to the one or more identified risk factors;

generating the response output comprising the proactive recommendation and one or more interactive elements comprising clickable links, buttons or menus, at least one of the one or more interactive elements being selectable to drill down into a corresponding area of the proactive recommendation.

7. The method of claim 2, wherein the response output is provided through an API endpoint that allows users to access at least part of the generative AI system, wherein the API endpoint receives the prompt from a client device associated with the user, and the API endpoint provide the response output in a structured data format comprising JSON or AXML, and wherein the API endpoint supports an authentication mechanism comprising an API key or a token to authenticate a request from the user, the request comprising an HTTP request specifying the prompt.

8. The method of claim 2, further comprising:

monitoring the performance of the generative AI system using a centralized server serving AI models;

collecting data on performance metrics of one or more generative AI models, the data comprising accuracy, response time, and resource utilization, the data being collected from one or more of user feedback, a system log, or a performance monitoring tool; and refining at least a subset of the generative AI system based on the results of the monitoring, wherein the refining comprising retraining the one or more generative AI models, the refining further comprising one or more of updating an architecture of the one or more generative AI models, adjusting a hyperparameter, incorporating additional training data, or employing transfer learning.

9. The method of claim 2, further comprising:

implementing one or more access controls configured such that AI-generated executable expressions have read-only access permissions to the data warehouse, wherein the one or more access controls comprise access control policies and role-based access controls that define and enforce the permissions of the AI-generated executable expressions, wherein the one or more access controls are implemented in a cloud computing environment and grant different levels of access permissions to different user roles comprising an administrator, an analyst, or a general user, and wherein an authorized administrator is able to change an access of the user in terms of one or more attributes or one or more employees.

10. The method of claim 9, wherein the one or more access controls define, for the user, a role-based permission specifying both (i) a subset of attributes of the employee data and (ii) a subset of employee records of the employee data that the user is permitted to access, the method further comprising:

restricting the data obtained by executing the executable expression to the subset of attributes and the subset of employee records permitted for the role of the user; and generating the response output to reflect a view of the data that is limited to the subset of attributes and the subset of employee records permitted for the role of the user, such that data outside the permitted view of the user is excluded from the response output.

11. The method of claim 1, wherein a similarity search is performed by comparing the generated embedding representation with pre-existing embedding representations of previously submitted prompts stored in a vector database, wherein the pre-existing embedding representations are stored as vectors in a high-dimensional space of the vector database, the vector database being constructed using word embeddings or sentence embeddings that encode a semantic meaning of the previously submitted prompts.

12. The method of claim 1, wherein at least a subset of the generative AI models is trained using an initial training dataset generated by a general language model, and the generative AI model is subsequently specialized to generate executable expressions in response to textual prompts from users, wherein specializing the generative AI model comprises fine-tuning the generative AI model on a specialized training dataset that is specific to a domain of people analytics, the specialized training dataset being curated from industry-specific documents, employee records, organizational data, and past interactions with the system and including a range of prompts related to people analytics, such that the fine-tuned generative AI model learns to generate executable expressions in response to such prompts, and wherein the specialized training dataset enables the generative AI model to adapt and evolve over time as new data and insights become available.

13. The method of claim 1, wherein the executable expression is retrieved from a database that associates prompts with corresponding executable expressions, wherein the database comprises a knowledge base or repository of predefined responses, and wherein the executable expression is retrieved when an identified similar prompt has a validated executable expression and is otherwise generated by the generative AI system.

14. The method of claim 1, further comprising:

categorizing prompts into different sets based on their topics or intents, wherein the different sets correspond to categories comprising one or more of employee retention, talent acquisition, payroll, diversity and inclusion, or work culture, and wherein the categorizing is performed using one or more of a natural language processing technique, a machine learning model, or a rule-based approach;

updating the categorized prompts based on user input to improve the accuracy and relevance of the categorization; and allowing users to use a category as a guide to quickly generate prompts related to specific topics.

15. The method of claim 14, further comprising:

maintaining a conversation context by tracking the history of user interactions and response outputs by storing prompts submitted by the user and corresponding generated response outputs to the stored prompts, the stored prompts and corresponding response outputs forming a knowledge base that is leveraged to understand an intent of the user; and generating follow-up responses to multiple follow-up prompts based on the conversation context and utilizing the generative AI system to generate appropriate response outputs to the follow-up prompts, wherein the generative AI system utilizes a same generative AI model that processed an initial prompt to generate the follow-up responses by leveraging contextual information from the conversation context;

displaying the follow-up prompts via a user interface;

receiving a selection, via the user interface, of a follow-up prompt; and generating, via the generative AI system, an additional response outputs based on the selected suggested prompt.

16. The method of claim 1, wherein the executable expression includes one or more structured query language statements where information relating to certain types of data are requested corresponding to tables of the table definitions, wherein the data warehouse comprises a plurality of tables for different types of information comprising a table for meeting information, a table for employee records, and a table for payroll, and wherein the one or more structured query language statements query a table, of the plurality of tables, corresponding to a type of data requested by the received prompt.

17. The method of claim 1, further comprising:

determining a type of query to generate and which table to query from the data warehouse, wherein the type of query is in a first query language or in a second query language, the first query language comprising structured query language statements, and the second query language comprising an Elasticsearch query, wherein determining the type of query comprises generating a structured query language statement when the received prompt requests a first type of data and generating an Elasticsearch query when the received prompt requests a second type of data.

18. The method of claim 1, wherein the type of response is a textual type or a graphical type, wherein the graphical type comprises one of a pie chart or a bar chart, and the textual type comprises one of a number, a percentage, or a sentence that includes a number.

19. The method of claim 1, further comprising:

providing for display a user interface comprising a text input field and a listing of plurality of categories;

receiving a selection of a category;

categorizing the prompt according to the selected category; and wherein the form of the received prompt includes the selected category; and determining and multiplexing one of the one or more large language models to deploy based on the selected category, wherein the multiplexing comprises tracking an accuracy metric for each of the one or more large language models and deploying, for the selected category, a large language model having a highest accuracy for the selected category, the accuracy metric comprising one or more of a percentage, a value, a ranking, or a score.

20. The method of claim 1, further comprising:

prioritizing generating, by the generative AI system, a response output that includes charts or infographics, wherein the prioritizing is based on a user profile of the user and one or more of a historical interaction or feedback of the user indicating a preference for visual representations.

21. The method of claim 20, wherein the user indicated a preference to tailor a response output format for visual representations, wherein the preference is indicated by an explicit request for a form of visual representation within the received prompt, and wherein the generative AI system is trained to take the explicit request into account in determining whether and which visual representation to generate for the response output.

22. The method of claim 1, further comprising:

determining a level of intricacy of the received prompt, wherein the determining comprises applying a complexity analysis algorithm to assess the level of intricacy; and based on the determined level of intricacy, performing parallel processing to optimize execution of the executable expression, wherein the performing parallel processing comprises distributing the execution of the executable expression across multiple nodes of the data warehouse.

23. The method of claim 1, wherein the generative AI system comprises a general-purpose large language model and a plurality of specialized language models each fine-tuned for a respective people-analytics task, the method further comprising:

generating, by the general-purpose large language model, a candidate response output and a candidate type of response for a given prompt;

receiving an annotation of the candidate response output and the candidate type of response;

storing the annotation as training data and fine-tuning, using the training data, one of the specialized language models for the respective people-analytics task;

serving, for a subsequent prompt associated with the respective people-analytics task, the response output from the fine-tuned specialized language model; and responsive to the response output served from the fine-tuned specialized language model being evaluated, based on received user feedback, as incorrect, routing the subsequent prompt to the general-purpose large language model to generate a further response output, receiving a further annotation of the further response output, storing the further annotation as additional training data, and iteratively fine-tuning the specialized language model using the additional training data.

24. A communication system comprising one or more processors configured to perform the operations of:

training one or more large language models of a generative AI system on domain-specific data comprising human resources data, wherein the trained one or more large language models generate embeddings in the context of people analytics;

providing, as an input to the one or more large language models of the generative AI system, table definitions relating to tables in a data warehouse, wherein the table definitions comprise a table definition for employee records;

receiving a prompt from a client device associated with a user, wherein the prompt is related to a text input or a voice input from the client device, and wherein the prompt is in natural language format;

providing a form of the received prompt and contextual information to a first large language model of the generative AI system;

obtaining, from the generative AI system, an embedding representation of the received prompt by tokenizing the received prompt into subword units or word-level tokens, that are processed through multiple layers of the first large language model, wherein each of a layer of the first large language model extracts different levels of linguistic information, wherein the embedding representation of the received prompt is a vector representation that encodes semantics and syntactic structure of the received prompt;

obtaining, from the generative AI system, an executable expression for responding to the received prompt, wherein the executable expression is in the form of a query that is described in a query language, and wherein the one or more large language models of the generative AI system matches the form of the received prompt to one or more tables of the table definitions that were provided as an input to the one or more large language models, and the generative AI system generates the executable expression based on the matched one or more tables, to be used for the query;

executing the obtained executable expression to query the data warehouse comprising one or more data sources to obtain data for a response to the received prompt, the one or more data sources including employee data;

determining, by inputting the received prompt into the generative AI system, and generating a type of response to be generated based on the received prompt, wherein the type of response to be generated is classified, via the generative AI system, as either a visual graphic output or a textual output, wherein the visual graphic output comprises a chart, a graph or a diagram;

determining a context of the user that submitted the received prompt, wherein the context comprises a user's department;

generating, by a second large language model of the generative AI system that is distinct from the first large language model, based on the determined context of the user and the data obtained from executing the executable expression, a response output corresponding to the determined type of response to be generated; and providing the response output to the client device associated with the user.

25. The communication system of claim 24, wherein receiving the prompt comprises:

displaying, within a user interface presented to the client device, a plurality of selectable generated prompts representing suggested prompts the user may wish to submit, wherein the plurality of selectable generated prompts comprises one or more previous prompts from a prior session that are displayed based on a determination that a current session is similar in context to the prior session; and receiving a selected one of the selectable generated prompts.

26. The communication system of claim 24, wherein the one or more processors are further configured to perform operations comprising:

implementing one or more access controls that grant the executable expression read-only access to the data warehouse and that define, for the user, a role-based permission specifying both (i) a subset of attributes of the employee data and (ii) a subset of employee records of the employee data that the user is permitted to access;

restricting the data obtained by executing the executable expression to the subset of attributes and the subset of employee records permitted for the role of the user; and generating the response output to reflect a view of the data that is limited to the subset of attributes and the subset of employee records permitted for the role of the user, such that data outside the permitted view of the user is excluded from the response output.

27. The communication system of claim 24, wherein the generative AI system comprises a general-purpose large language model and a plurality of specialized language models each fine-tuned for a respective people-analytics task, and wherein the one or more processors are further configured to perform operations comprising:

generating, by the general-purpose large language model, a candidate response output and a candidate type of response for a given prompt;

receiving an annotation of the candidate response output and the candidate type of response;

storing the annotation as training data and fine-tuning, using the training data, one of the specialized language models for the respective people-analytics task;

serving, for a subsequent prompt associated with the respective people-analytics task, the response output from the fine-tuned specialized language model; and responsive to the response output served from the fine-tuned specialized language model being evaluated, based on received user feedback, as incorrect, routing the subsequent prompt to the general-purpose large language model to generate a further response output, receiving a further annotation of the further response output, storing the further annotation as additional training data, and iteratively fine-tuning the specialized language model using the additional training data.

* * * * *